Dec. 21, 1965  E. WILDHABER  3,224,223
TOOTHED COUPLING
Filed Sept. 9, 1963

INVENTOR:
Ernest Wildhaber

United States Patent Office 3,224,223
Patented Dec. 21, 1965

3,224,223
TOOTHED COUPLING
Ernest Wildhaber, 124 Summit Drive, Brighton, N.Y.
Filed Sept. 9, 1963, Ser. No. 307,380
4 Claims. (Cl. 64—9)

The present invention relates to toothed couplings also referred to as flexible couplings or gear couplings, and particularly to toothed couplings comprising an internally toothed outer member and an intermeshing externally toothed inner member. More specifically it relates to toothed couplings in which the internally toothed outer member has straight teeth and engages an externally toothed inner member with crowned teeth.

In my Patent No. 2,922,294 granted January 26, 1960 the required exact tooth shape of toothed couplings has been disclosed and ways of producing it by hobbing have been described.

Here now a modified tooth shape is disclosed that can be produced on machines using a Fellows-type pinion-shaped cutter and on machines using a disk-type milling cutter. While this tooth shape is in principle more restricted as to shaft angularities, it gives acceptable shapes on nearly all the couplings used at present, and represents a substantial improvement over what could previously be accomplished on such machines.

One object of the present invention is to produce toothed couplings on machines of said type that are distinctly superior to the couplings hitherto produced thereon.

A further object is to produce thereon toothed couplings whose inner members have maximum crowning in the middle of the teeth and decreasing crowning towards the tooth ends. In this way the portions operating at increased shaft angularity have larger radii of curvature lengthwise of the teeth and are strengthened. They have wider contact zones, to make up for the fewer teeth in contact and the increased tooth sliding.

Figure 1:
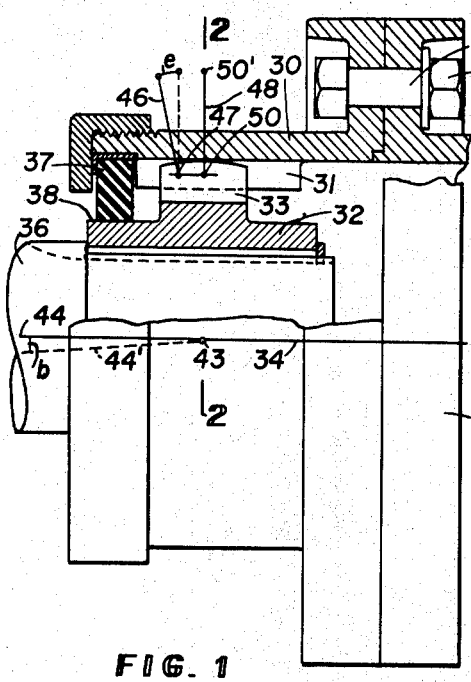
FIG. 1 is an axial section, partly a side view, of a coupling of the type referred to and formed according to the present invention.
Figure 2:
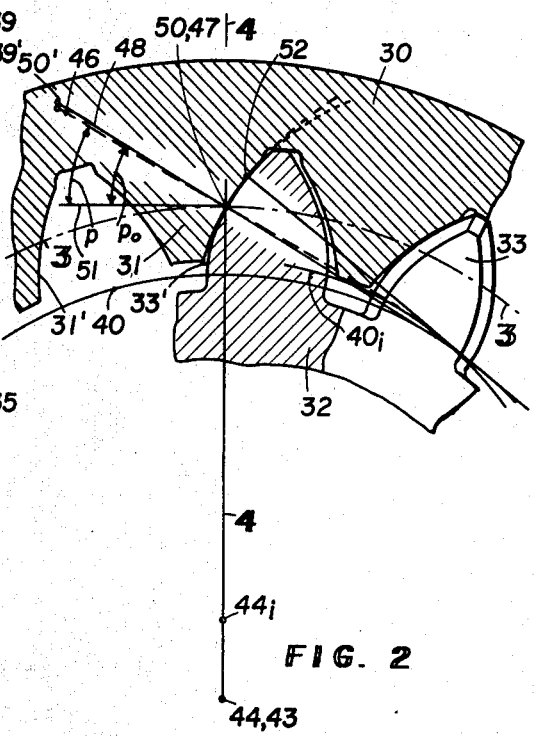
FIG. 2 is a fragmentary cross-section of this coupling at a larger scale, taken along lines 2—2 of FIG. 1, and showing also one tooth of the inner member in an axial view.

Numeral 30, FIGS. 1 and 2, denotes an internally toothed outer member having straight teeth 31 that extend parallel to its axis 34. The externally toothed inner member 32 contains crowned teeth 33 that engage the teeth 31. Member 32 is rigidly secured to a shaft 36 by conventional means. The crowning of the teeth 33 permits the inner member 32 to tilt about its center 43 a limited amount while retaining the tooth contact well within the boundaries of the teeth. Thus the axis 44 of the crowned inner member may assume a tilted position 44', at an angle b to axis 44. Most frequently pairs of couplings are provided. They contain coaxial outer members 30, 35 provided with identical teeth 31. These engage equally toothed inner members 32. A seal 37 engages a cylindrical surface 38 provided on member 32, to retain lubricant at the teeth. The two outer members 30, 35 are rigidly secured together by screws 39 and nuts 39'.

The tooth profiles are shown in FIG. 2. The profiles 31' of the teeth 31 are concave and substantially curved. They are shown here as involutes having a base circle 40. They could also be other curves, such as for instance circular arcs.

The side surfaces of the crowned teeth 33 should be such that uniform motion is transmitted at the various shaft angularities. The relative velocity between two rotating members 30, 32 at any point of contact can be resolved into a component lying in the tangent plane at said point and into a normal component in the direction perpendicular thereto, that is, in the direction of the surface normal at said point. Obviously the normal velocity components of the two members should be equal. Otherwise the two members could not contact at said point. They would either separate or move into each other.

With involute teeth 31 the normal components at all points of the tooth sides are equal to the peripheral velocity of the base circle 40. They are all alike. Hence a basic requirement for the mating crowned tooth sides is a configuration which also gives equal normal components at all points of the working surfaces.

This requirement can be transformed into a requirement for the tooth-surface normals. Theoretically all the tooth-surface normals at points within the working surface of the crowned teeth should have the same leverage with respect to the rotational axis, so that a given turning angle about said axis will produce a constant displacement component in the direction of the surface normal. Another way of expressing this is: The tooth surface normals should be so directed that a given force acting along them produces a constant turning moment with respect to the axis of rotation.

46 denotes the surface normal at a tooth-surface point 47 lying in the drawing plane of FIG. 1 (FIGS. 1 and 2), while 48 denotes the surface normal at point 50 of the midplane 2—2. Point 50 also lies in the drawing plane of FIG. 1: The tooth side is considered turned slightly from the previous position about axis 44, until it passes through point 50. The tooth surface normal 48 is tangent to base circle 40. It includes a pressure angle $p_0$ with the peripheral direction 51. Let the length $$50\text{–}50' = f$$

be a measure of a force directed along normal 50. Its peripheral component is then $f \cdot \cos p_0$. The turning moment exerted by this force on member 32 is the product of the peripheral component $f \cdot \cos p_0$ muliplied with the radial distance of point 50 from axis 44. Point 47 has the same radial distance as point 50. To produce the same turning moment its normal 46 should be so inclined that the force $f$ acting along it has the same peripheral component $f \cdot \cos p_0$. This means it should include the same angle $p_0$ with the peripheral direction (51 in FIG. 2).

In FIG. 2 the normal 46 appears at an inclination $p$ smaller than the inclination $p_0$ of normal 48. The inclination $p$ of the projected surface normal 46 is also the inclination or pressure angle of the sectional profile that lies in a plane perpendicular to the rotational axis 44, as is readily understood in mathematics.

The term pressure angle or profile inclination used herafter applies always to sectional profiles in planes perpendicular to the rotational axis.

Figure 3:
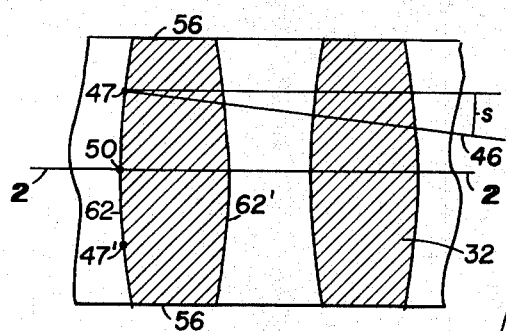
FIG. 3 is a fragmentary cylindrical section of the inner member taken along circle 3—3 of FIG. 2 and developed into a plane.

When $e$ denotes the angle between the projected normals 46 and 48 as seen in FIG. 1, angle $p$ can be defined as (1) $\quad\quad\quad \tan p = \tan p_0 \cdot \cos e$ In FIG. 3 the projected normal 46 appears inclined to the peripheral direction at an angle $s$. It can be shown mathematically that this angle is related to angle $e$ as follows:

(2) $\quad \tan s = \tan p_0 \cdot \sin e; \sin e = \tan s \cdot \operatorname{ctn} p_0$ These formulas let us compute the changing pressure angle required theoretically at any point along the teeth of the crowned inner member 32.

Pressure angle $p$ should decrease at a gradually growing rate from the midplane 2—2 towards the tooth ends.

The Fellows process of generating the externally toothed inner member cannot produce this change of pressure angle. At best it can produce a constant pressure angle $p$, as will be shown. Milling processes are known, where the tooth sides produced are surfaces of revolution about axes that lie in the midplane 2—2 (FIG. 1). The pressure angles produced thereby at a constant radial distance from the axis increase from the midplane towards the tooth ends. In both cases the pressure angle or profile inclination adjacent the two ends of the teeth is at least as large as at the tooth middle, at a constant radial distance.

A product much improved over what was hitherto attainable with these processes is obtained in accordance with the present invention by:

(1) Providing the required decreased pressure angle $p$ at points 47, 47' (FIGS. 1 and 3) equally distant from the midplane 2—2 and well inside the tooth ends;

(2) Providing profiles on the inner member that are more curved than the concave profiles of the outer member, so that when the axes are aligned the profiles contact at a point (52 in FIG. 2) well inside the working profile and located between the mid-point 50 and the outer end of the profile 33' of the inner member;

(3) Providing a pinion-like shaping tool capable of producing equal profiles along the length of the crowned teeth, so that they are portions of identical profiles that are merely turned about the axis of the inner member, and that the tooth sides are exactly symmetrical to the midplane (2—2);

(4) Preferably providing maximum crowning in the mid-portion and gradually decreased crowning towards the tooth ends, so that an axial section (FIG. 4) laid through a mean point 58 of a crowned tooth side has a convex sectional profile of varying curvature, the curvature radius thereof being smallest at the tooth middle and increasing towards both ends of the teeth.

According to the invention the tooth portions away from the midplane are improved and favored, because they operate at shaft angularity, where fewer teeth are in contact than at near-alignment, and where there is more tooth sliding. The increased shaft angularities constitute the weak spot of a conventional coupling. Here now the weak spot is strengthened. Near-zero shaft angularity has all the teeth in contact on accurately made couplings and can well afford a tooth bearing centered at a point 52 away from mid-point 50.

The weak spot is further strengthened by a design according to point 4. It has a profile 55 in an axial section (FIG. 4) most curved at the midplane 2—2 and less curved towards the tooth ends 56. 57 is the curvature center at point 58 of the midplane, while 60, 60' denote the curvature centers at points 47, 47' respectively. The curvature radius 47–60 is much larger than curvature radius 58–57, preferably at least 50% larger. Intermediate points have intermediate curvature radii, whose curvature centers lie at the points of contact of the normals with the two-branched curve 61 enveloped thereby.

FIG. 3 shows the longitudinal profiles 62, 62' of the teeth, in development to a plane. These profiles also have a varying curvature. They are most curved in the mid-portion and gradually less curved towards the tooth ends 56, and give a wider zone of contact at shaft angularity, under very light load.

In applying the invention we may start out from the profiles 62, 62', FIG. 3. Their largest inclination $s$ is adjacent the tooth ends 56. It is nearly equal to and moderately larger than the maximum shaft angularity $b$ of the coupling in operation. An intermediate point 47 is then assumed and the inclination $s$ of its normal 46 is determined. Angle $e$ (FIG. 1) at point 47 is then computed with Formula 2, after assuming pressure angle $p_0$. Formula 1 then determines the pressure angle $p$ at point 47.

In a graphical procedure the normal is then drawn in FIG. 2 through point 47 at the inclination $p$ to the peripheral direction 51. It is shown dotted and is slightly offset from base circle 40.

Then contact point 52 is selected and the common normal at that point is drawn through point 52 tangent to base circle 40. The profile 33' may be made an involute whose center $44_i$ lies on radius 44–47 and whose base circle $40_i$ contacts both said common and normal 46. The thus determined profile 33' is more curved than involute 31'.

The above described geometric construction can also be expressed with formulas for computation, as is readily understood by people familiar with mathematics, so that accurate computation is feasible.

Figure 4:
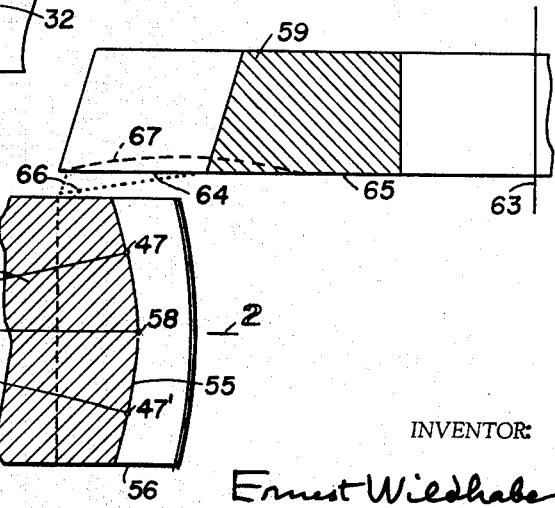
FIG. 4 is a fragmentary axial section of the inner member, taken along lines 4—4 of FIG. 2, and showing also a shaping tool for generating it.

In the Fellows process a pinion-shaped tool 59, FIG. 4, is reciprocated along its axis 63, and as it moves along the teeth it also turns on its axis to follow and produce curve 62 (FIG. 3) and curve 62' in alternate strokes. Also both the member 32 and the tool 59 are slowly fed about their axes 44 and 63 respectively in time with each other.

In accordance with the invention the tool 59 has cutting edges 64 that lie in a plane 65 perpendicular to the tool axis 63, while the tool as hitherto used has cutting edges inclined to said plane. The cutting faces of this conventional tool lie in a slightly internal conical surface indicated in dotted lines 66. Such cutting faces are suitable for straight tooth sides. But on the crowned tooth sides of coupling members they produce a pressure angle larger at one end of the teeth than at the other end, as can be demonstrated mathematically. The tooth profiles in parallel planes perpendicular to the axis of the inner member are then not portions of identical profiles that are turned about said axis. The tooth sides are no longer exactly symmetrical to the midplane 2—2, as they should be.

The cutting edges 64 overcome this difficulty.

In one embodiment cutting faces are provided that themselves are parts of plane 65. In a more refined embodiment the cutting face of each cutting tooth is a concave surface of revolution so determined that its profiles in plane 65 are identical with the cutting profiles. Dotted line 67 (FIG. 4) denotes the bottom of this concave cutting face, which gives a cleaner cut with improved finish.

Having thus described my invention, what I claim is:

1. A toothed coupling comprising an internally toothed outer member with longitudinally straight teeth and an externally toothed inner member with crowned teeth engaging said straight teeth and extending lengthwise along continuous convex curves, said straight teeth having concavely curved tooth profiles, said crowned teeth having convex tooth profiles in planes perpendicular to the axis of rotation of said inner member, the inclination of said convex profiles to the radial direction, at a constant distance from the axis of rotation, being at least as large adjacent a tooth end as at the tooth middle, said convex profiles being more curved than said concave profiles and at their mid-portion being less inclined to the radial direction than said concave profiles so that they contact said concave tooth profiles in a region between said mid-portion and their outside ends when the axes of the two members are aligned.

2. A toothed coupling according to claim 1, wherein the tooth bottoms of the inner member extend parallel to the axis of said member and wherein its tooth profiles in parallel planes perpendicular to said axis are portions of identical profiles that are turned about said axis.

3. A toothed coupling according to claim 1, wherein an axial section laid through a mean point of a tooth side of the crowned inner member has a convex sectional profile of varying curvature, the curvature radius thereof being smallest at the tooth middle and increasing towards both ends of the teeth.

4. A toothed coupling according to claim 3, wherein the curvature radius of said sectional profile is at least fifty percent larger at the outmost working portion adjacent the tooth ends than the curvature radius at the tooth middle.

References Cited by the Examiner
UNITED STATES PATENTS

| | | | |
|---|---|---|---|
| 1,891,285 | 12/1932 | Loewus | 64—9 |
| 2,688,856 | 9/1954 | Heisler | 64—9 |
| 2,841,966 | 7/1958 | Belden et al. | 64—9 |
| 2,922,294 | 1/1960 | Wildhaber | 64—9 |
| 3,013,411 | 12/1961 | Wahlmark | 64—9 |

ROBERT C. RIORDON, *Primary Examiner.*
FRANK SUSKO, *Examiner.*